ized Patent  [11] 3,548,737

| [72] | Inventor | Monroe E. Evans<br>Fayetteville, N.C. |
|---|---|---|
| [21] | Appl. No. | 859,145 |
| [22] | Filed | Sept. 18, 1969 |
| [45] | Patented | Dec. 22, 1970 |
| [73] | Assignee | Cape Fear Feed Products, Inc.<br>Fayetteville, N.C.<br>a corporation of North Carolina<br>Continuation-in-part of application Ser. No.<br>572,115, Aug. 12, 1966, now abandoned.<br>This application Sept. 18, 1969, Ser. No.<br>859,145 |

[54] TERMINAL HEATING APPARATUS FOR FREEING FEED INGREDIENTS OF SALMONELLA
7 Claims, 5 Drawing Figs.

[52] U.S. Cl. .................................................. 99/235,
99/216, 99/251
[51] Int. Cl. .................................................. A23k 3/00
[50] Field of Search .......................................... 99/2, 7,
210, 216X, 161, 211, 215, 234, 235, 251, 249;
21/21, 56, 91, 94, 95

[56] References Cited
UNITED STATES PATENTS

| 2,363,282 | 11/1944 | Arnold ........................ | 99/235X |
| 2,679,457 | 5/1954 | Shaw .......................... | 99/7 |
| 2,909,984 | 10/1959 | Rycraft Jr. et al. ............ | 99/235 |
| 2,953,429 | 9/1960 | Shiffler ....................... | 21/2 |
| 3,159,493 | 12/1964 | Japikse et al. ................ | 99/216 |

FOREIGN PATENTS

| 687,140 | 1/1940 | Germany ..................... | 99/235 |

Primary Examiner—Billy J. Wilhite
Attorney—B. B. Olive

ABSTRACT: A continuous, large volume terminal heating apparatus for freeing ground, high-fat and high-bulk density, organic feed meal particles of salmonella without affecting moisture and nutritional content or the particle form includes a series of vertically stacked conveyors which in the first conveyor subject the particles to flash heating while tumbling the particles in dry steam to elevate their temperature, in subsequent conveyors cause movement of the particles while maintaining them at the elevated temperature, and finally while continuing movement in other conveyor apparatus cause the temperature of the particles to be brought down to a level at which there is no tendency for the particles to cake.

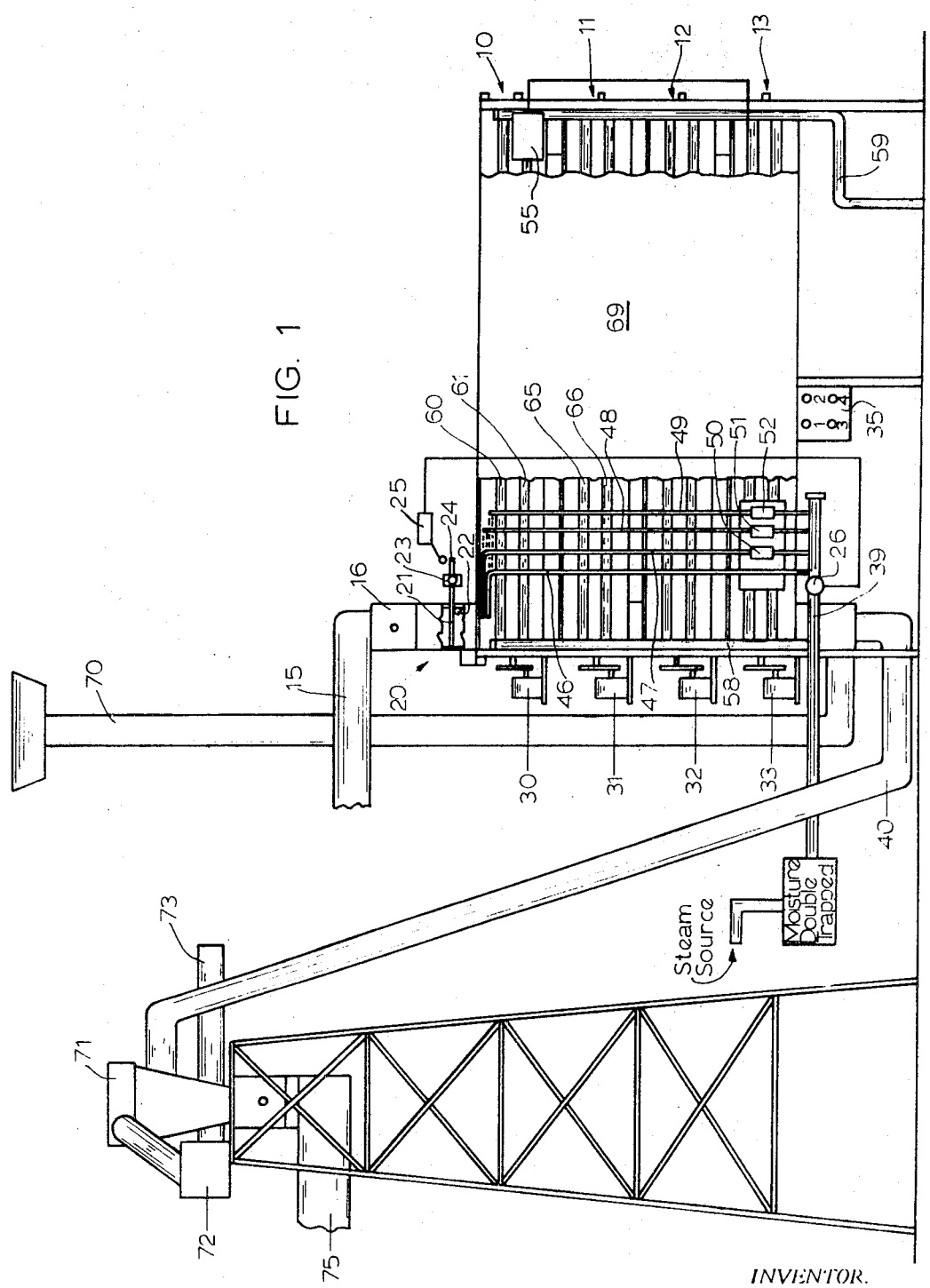

3,548,737
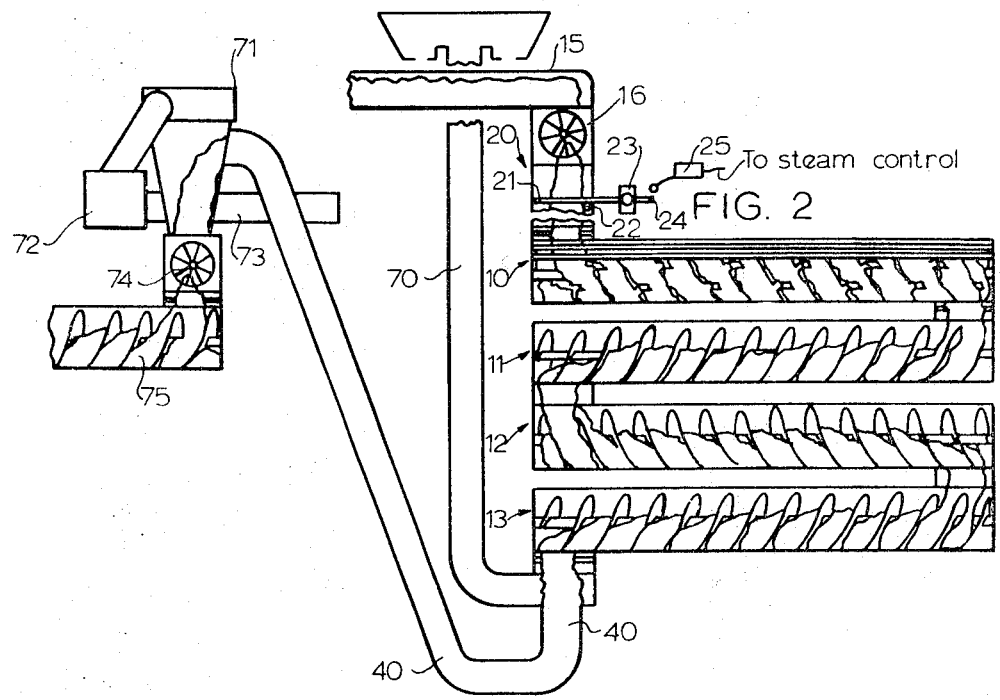
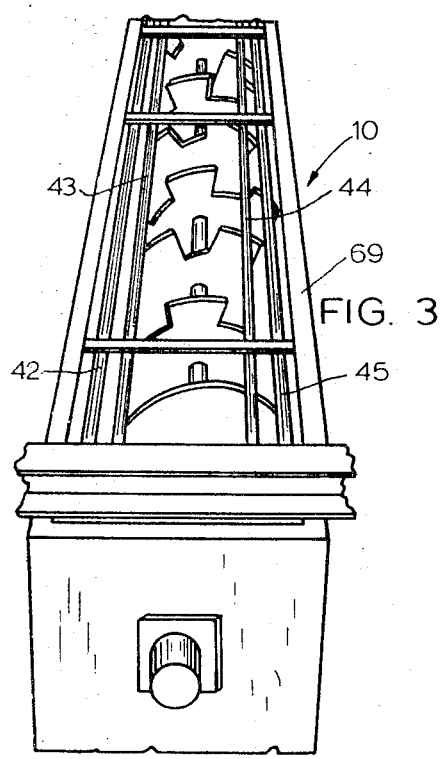
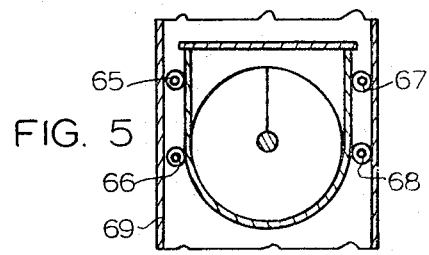
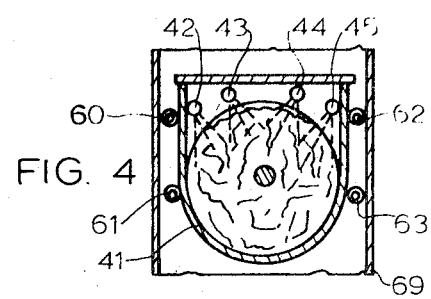
INVENTOR.
Monroe E. Evans
B. B. Olive
ATTORNEY

> 3,548,737

TERMINAL HEATING APPARATUS FOR FREEING FEED INGREDIENTS OF SALMONELLA

CROSS REFERENCE TO RELATED APPLICATIONS

The present invention relates to and forms a continuation-in-part of an application having the title Process For Freeing Feed Ingredients of Salmonella, Ser. No. 572,115 filed by Monroe E. Evans on Aug. 12, 1966, now abandoned. The present invention and the subject copending application are related in that both applications are based on use of injected dry steam and controlled, timed, heat, cooling and moving steps to effectively kill salmonella in feed meal particles. A further related improvement in the process is covered by copending application Terminal Heating Process for Freeing Feed Ingredients of Salmonella, filed Sept. 15, 1969 Ser. No. 857,837.

BACKGROUND OF THE INVENTION

1. Field of the Invention

This invention relates to a terminal heating apparatus for destroying salmonella, i.e. virus and bacteria, in feed material of particle form and particularly to apparatus which is for continuous, large volume operation as opposed to batch, discontinuous or small volume, for maintaining particle character as opposed to forming cakes and for maintaining nutritional and moisture values.

2. Description of the Prior Art

Salmonella is a generic term used to describe a collection of over 1600 serotypes of viruses and bacteria which are toxic to humans and selected stock animals. The problem of salmonella control and its seriousness to humans is discussed in a pamphlet entitled "Salmonella Surveillance" which was published Nov. 30, 1965, by the U.S. Department of Health, Education and Welfare as Report No. 43 and in a pamphlet entitled "Sanitation Guidelines for Salmonella Control" which was published in May, 1965 by the U.S. Department of Agriculture as ARS 91-51. The problem of salmonella control as well as the harm it may cause and the sources of the same was covered in detail during the National Conference on Salmonellosis held Mar. 11—13, 1964. The proceedings of this conference were published in Mar. 1965 and are identified by "Public Health Service Publication No. 1262". In that publication, the role of the animal feed industry in the control of salmonella was dealt with exclusively on pages 161 to 164. Feed meals, which are to be fed to chickens and other stock animals, are easily contaminated with salmonella during manufacturing through improper handling, improper exposure and the like. Feed meals as contemplated by this invention includes organic animal, marine and vegetable products which have been ground or otherwise reduced in particle size and are in particle form prior to being treated by the apparatus of this invention and are required to remain in particle form subsequent to being treated by the apparatus of this invention. Particle size may range between 20 mesh and ¼ inch. Moisture content of the particles as introduced may, for example, range between 1 percent and 12 percent, bulk density between 25 lbs. per cubic ft. and 50 lbs. per cubic ft., and fat content between 2 percent and 20 percent.

The salmonella most often does not affect the stock animals but is retained by them and is passed to humans to whom the salmonella is toxic. Therefore, it can be seen that the stock animals act essentially as a carrier for the salmonella although they are not diseased by it. While salmonella detection is old as to some serotypes, only recently have methods been provided which give conclusive results upon analysis and only in the relatively recent past have many of the now known serotypes been identified. For example, in 1960 there were perhaps only about 200 indentified serotypes of salmonella. The standard procedure for detecting salmonella is disclosed in the U.S. Department of Health, Education and Welfare manual entitled "Bacteriological Analytical Manual," second edition, published Jan., 1969. A salmonella-free material as used herein is that processed material in which the presence of presently identifiable serotypes of salmonella are not detectable when sampled by procedures outlined in ARS 91—51 and subjected to laboratory examination as outlined in the "Bacteriological Analytical Manual." However, this method is very time consuming and it is generally a period of days before conclusive results are available.

From the above it can be seen that it is not practical to analyze each batch of feed meal manufactured. Large plants which produce several tons of the feed material daily have no means to store the various batches of feed material while waiting for the results of the salmonella tests. Furthermore, the storing of large quantities of feed meal in the same container would result in the contamination of the lot if any salmonella were present for salmonella spreads rapidly through any like mass of material. To date, the only practical way for obtaining a salmonella-free feed meal has been to eliminate the salmonella as a step in the manufacture of the feed meal and prior to shipment to the customers and to randomly examine selected samples thereof.

Some forms of heat apparatus have been found which are said to be effective to kill insects in grain, to sterilize and to kill spores and the like in flour, grain, liquid egg, raw fish and other materials. However, these apparatuses are expensive to operate, are generally batch and noncontinuous in their operation, handle small volume of a few pounds per hour and are not effective to kill the many serotypes of salmonella in ground, organic feed meals on a quantity scale. In some of the prior art apparatuses the material e.g. flour, is required to be agitated and mixed with air or another gas before entering the apparatus. In other apparatuses the material, e.g. raw fish, is required to be compressed or compacted before being processed by the apparatus. Other apparatuses are directed to processing nonground, nonorganic forms, e.g. grains of wheat. Thus, prior art apparatus have not dealt with destroying salmonella in feed meal materials in ground particle form and where the material enters, passes through and leaves the apparatus as a free flowing stream of particles.

Forced hot air and infrared heating apparatuses have been tried but both have been found unsatisfactory. Hot air when forced through bin stored feed meal effects evaporation and thus reduces moisture content and changes nutritional assays both of which are highly undesirable changes in the material. Furthermore, vibrating tables in the presence of infrared heat, forced hot air or steam have been found to be highly ineffective. For example in one experiment which led to the present invention it was found that when organic feed meal particles were placed on a vibrating table, infrared heat would not penetrate more than about ¼ inch and if tumbled the temperature on the top of the material would instantaneously drop from 190° F. to 110° F.

Applicant's copending application Ser. No. 572,115 discloses a continuous operating, large volume apparatus and process which has proven both economical and practical for eliminating salmonella in ground, organic feed meals of high bulk density and high fat content without destroying the particle character, lowering the nutritional values or increasing the moisture content. The initial apparatus of copending application Ser. No. 572,115 is repeated in the apparatus of the present application namely that of providing a conveyor which causes tumbling and moving the particles in an enclosed horizontal, insulated tubular receptacle while subjecting them for a short time period to an atmosphere exclusively of live dry steam and rapidly bringing the particles to a minimum temperature within the range of 165° F. to 180° F. In the apparatus of copending application Ser. No. 572,115 the particles, after leaving the first conveyor, are next continuously fed to an enclosed, insulated, externally heated vertical bin receptacle which forms a continuation of the first tubular receptacle and in which the particles are kept moving as particles but as a mass and while being held at 165° F. Finally, a conveyor is provided by means of which the particles are continuously withdrawn and while kept moving in subsequent enclosed receptacles are cooled down to 120° F. before being stored or otherwise brought to rest. The apparatus of copending application Ser. No. 572,115 while satisfactory for its purpose has been found to have certain inherent disadvantages. Among such disadvantages are the fact that approximately 20-minutes processing time is required, substantial floor space is required and the fact that the bin apparatus does not lend itself to the positive and uniform heat control and movement obtained by the present invention.

SUMMARY OF THE INVENTION

The terminal heating apparatus of the invention is directed to freeing ground, high-bulk density and high-fat content, organic feed meals of presently identified forms of salmonella according to present methods of test and identification. Furthermore, it is directed to receiving such material in particle form, in a free flowing, gravity fed stream at ambient temperature. The particles are not required to be compacted, pressurized, mixed with pressurized air or other gas, or broken up by agitators prior to entering the first receptacle of the apparatus of the invention. The apparatus is a relatively fast continuous and large volume (thousands of pounds/hour) apparatus and neither destroys the nutritional value or raises the moisture content.

During all operations of the apparatus the material retains its particle character and is kept heated and under positive mechanical conveyor movement in enclosed receptacles. The first receptacle is an enclosed, insulated, horizontal, heated, tubular receptacle and in this the material particles are injected with dry, live steam, are tumbled continuously and in a very short time period, e.g. 2 to 2½ minutes, are brought to a minimum temperature in the range of between 165° F. to 180° F. depending on the nature of the contamination, the density and type of organic, ground feed material being processed. Most ground feed materials adapted to the invention and forms of salmonella are regarded as requiring a minimum temperature of 180° F. in the first receptacle. Next, the material is positively moved through a series of connected, enclosed, insulated, tubular, heated conveyor receptacles which hold the material at a minimum temperature of between 165° F. to 180° F. for a substantially longer period than the initial steaming period, e.g. 6 to 10 minutes. The material is finally cooled down to 120° F. while being kept in continuous motion in continuing enclosed receptacles and before being sacked or otherwise processed in a static state.

With the foregoing in mind, the general object of the apparatus of the present application is to improve on the apparatus of copending application Ser. No. 572,115. More specifically, the object of the present apparatus is to provide a faster and therefore larger volume apparatus, an apparatus having more positive control of the material and an apparatus which utilizes substantially less floor space.

DESCRIPTION OF THE DRAWINGS

FIG. 1 is a side elevation, partially schematic, view of the apparatus of the invention.

FIG. 2 is a somewhat schematic diagram of the material flow through the apparatus.

FIG 3 is a perspective view of a modified cut and fold type, heated and insulated screw conveyor suited to injecting dry steam, tumbling and rapidly advancing the material particles in the first receptacle.

FIG. 4 is an enlarged sectional view of the steam injection and tumbling screw conveyor of FIG. 3.

FIG. 5 is an enlarged sectional view of the typical heated and insulated screw conveyor used to slowly advance the material and maintain its temperature after it has been flash heated by dry steam injection in the first tumbling conveyor.

DESCRIPTION OF THE PREFERRED EMBODIMENT

Referring to the drawings, the apparatus utilizes a terminal heating system which comprises four heated screw conveyors 10, 11, 12 and 13. Conveyor 10 is a "cut and fold" type conveyor and is designed to tumble the feed particles while rapidly advancing the mass of particles axially or longitudinally of the conveyor. Ground, organic, feed material often of high-bulk density and high-fat content at ambient temperature is fed in article form and in a free flowing stream from a suitable source generally represented by intake pipe 15. Pipe 15 connects to a so called airlock 16 which is basically understood, by those skilled in the art, as being a paddle wheel arrangement which fills with the material on one side, is continuously rotated mechanically and dumps on the other side to thereby minimize the amount of ambient and possible salmonella-contaminated air entering the apparatus. Material discharged from airlock 16 is directed onto a flopper valve 20. Valve 20 basically consists of a baffle plate 21 which tilts on a suitable pivot schematically shown at 22 and operates against the force of an adjustable weight 23 mounted on an external arm 24. Tilting of arm 24 controls operation of valve control switch 25. Switch 25 in turn controls steam valve 26 which controls injection of steam into the material in conveyor 10. Weight 23 is adjusted to counterbalance the bulk density so that with a substantially uniform flow, the weight of material across plate 22 will keep valve 26 on and the steam injection operating uniformly.

Each conveyor has its respective electric motor drive 30, 31, 32 and 33 and an electric control box 35. The conveyors are aligned longitudinally and stacked vertically as shown. Conveyor 10 discharges to conveyor 11, conveyor 11 to conveyor 12, conveyor 12 to conveyor 13 and conveyor 13 to a discharge pipe 40 later discussed. Thus, the apparatus moves the material back and forth and downwardly along a heated path. In this regard it will be observed that a substantially long exposure to heat may be contained with a minimum floor space requirement equal to that required for the bottom conveyor.

Conveyor 10 has a "cut and fold" configuration as shown in FIG. 3. Internally of the horizontally positioned, tubular receptacle 41 of conveyor 10 there are mounted four steam injection pipes 42, 43, 44 and 45 which extend the length of conveyor 10 and which have numbers of spaced steam exit holes not shown in detail but which should be understood as being spaced along the length of each pipe. The injection pipes receive dry live steam from a main double trapped line 39 through supply pipes 46, 47, 48 and 49. Supply pipe 46 receives live dry steam preferably at 350° F. whenever valve 26 is open and supply pipes 47, 48 and 49 have individual temperature controlled valves 50, 51 and 52 which are controlled by a temperature sensor 55. By trapping out moisture particles the steam is of course made dry and loses any tendency to substantially effect the inherent moisture content of the material. Temperature of the material is measured and recorded by sensor 55 with a thermometer not shown but that is placed in the stream as the material flows out of conveyor 10 into conveyor 11. In the embodiment on which the application is based, when main valve 26 is initially opened, valves 50, 51, 52 are also opened but valves 50, 51, 52 are selectively cut out as the measured temperature of the material at the end of conveyor 10 reaches levels of 190° F., 200 ° F., and 210° F. Thus, at 210° F. measured temperature only one of steam injection pipes 42, 43, 44, 45 is in operation whereas when the material first starts flowing and the measured temperature is below 190° F. all four of the steam injection pipes are operational. In this manner the actual mean temperature of the mass of particles as measured at the end of their travel in conveyor 10 is always brought to at least 165° F. and preferably at least 180° F. before the particles exit from conveyor 10. Other temperature actuation and steam pipe arrangements could of course be used to obtain the desired 165—180° F. range.

All of the screw conveyors 10, 11, 12 and 13 are kept heated by steam pipes or other sources of external heat such that the interior temperature of each conveyor in the voids through which the material moves is kept heated to at least 180° F. Such steam pipes are fed from a supply pipe 58, exhaust through a line 59 and are indicated at 60, 61, 62 and 63 in FIG. 4 and at 64, 65, 66 and 67 in FIG. 5. Suitable insulation walls 69 help retain the heat and thus reduce the cost of operation. The interior voids of all the conveyors are made to reach a temperature of at least 180° F. before any material is processed. Thus, the insulated, enclosed, horizontal, heated and generally tubular conveyors 11, 12 and 13 are made alike and are primarily designed to provide heated space and to keep the material moving, without tumbling, while retaining the individual particles at a minimum temperature within the 165° F. to 180° F. range. The four conveyors essentially form a common enclosed, heated, insulated, substantially unpressurized, receptacle in all portions of which the ground particles are kept in particle form, under positive conveyor control and in positive motion, in the initial portion of which (conveyor 10) the particles are tumbled and advanced in an atmosphere exclusively of dry live steam and raised to a minimum temperature in the range of 165° F. to 180° F. in a relatively short steaming period, e.g. 2 minutes, and in the final portion of which (conveyors 11, 12, 13) the particles are secluded from ambient air, are kept under positive mechanical movement and are held within said minimum temperature range for a relatively longer retention period, e.g. 6 minutes. After start up and reaching of a steady state condition, the rate of flow in and out of the conveyors can be and normally is continuous at a rate measured in tons per hour and when discharged from conveyor 13 is 100 percent salmonella free according to presently identified serotypes of salmonella and present methods for identifying such serotypes. Furthermore, such positive and continuous conveyor movement through the heated conveyor interiors following tumbling has been discovered to give excellent heat control, and insures retention of the particle form of the organic feed material of high fat content which otherwise would have a tendency to cake or bridge if allowed to assume a static position at an elevated temperature. Also, by using dry steam and constantly pulling off excess steam as later discussed, moisture level is held within two percent of the total material weight and nutritional value assays show essentially no change.

The apparatus of the invention as compared to prior art apparatuses avoids caking and bridging, avoids moisture and nutritional changes and avoids loss of the particle form while handling tons of material on a relatively fast and continuous basis. Hot air apparatus, as previously stated, inherently causes evaporation and inherently changes both moisture content and nutritional assays. Such hot air apparatus, unlike the apparatus of the invention, requires perforate receptacles for flowing the hot air through the material and the perforations introduce both spillage and sanitation problems. Infrared heat has given only modest heat penetration and such heat has been entirely impractical for all prior art apparatuses for processing ground, organic feed materials having bone particles. Infrared heat also introduces problems of burning if too close to the material. Vibration tables with infrared heat have proven completely unsuccessful for ridding ground, organic feed meals of salmonella. Furthermore, some of the prior art apparatuses require that the material be pressed and compacted or that it be agitated and loosened before entering the apparatus. In the apparatus of the present invention the material is continuously introduced in particle form, is continuously processed while being retained in particle form and is discharged in particle form. No supplementary gas apparatus such as pressurized air apparatus or the like is required preliminary to processing with the apparatus of the invention. Regulated pressurized vessels found in the prior art are not required in the apparatus of the invention.

Continuing the description, it will be noted from the schematic diagram of FIG. 2 that the tumbling, loose material particles are introduced at a rate which essentially fills conveyor 10 when tumbled whereas when moved, without tumbling, in subsequent conveyors 11, 12, 13 the material essentially fills only half the available conveyor space. In both cases the material should however be understood as moving at the same tons per hour rate which may, for example, range from 5 to 30 tons per hour. A typical system utilizing the apparatus of the invention employs 20-inch diameter conveyors which are 36 feet long each, have a material travel time of 2 minutes each and process 20 tons per hour. The actual killing of the salmonella may take place in as little as a total of 8 minutes for the combined steaming and retention period and is completed by the time the material reaches the discharge end of conveyor 13.

The now salmonella-free material discharged by conveyor 13 next moves into unheated, uninsulated, enclosed receptacles which form a continuation of conveyors 10, 11, 12 and 13 and which provide a final moving-cooling step. For this purpose, uncontaminated cooling ambient air is preferably drawn in at a high elevation by stack 70 or from another suitable source and mixes with the discharged and heat treated feed material particles in tube 40 to effect cooling to 120° F. or below. Tube 40 connects with a conventional cyclone type separator 71 and an air fan 72 which draws in cooling air and separates and discharges the waste air and any waste steam through pipe 73. The treated material discharges from cyclone separator 71 through another airlock 74 and into a screw conveyor for transfer to storage, sacking and the like.

The described steam injection and air cooling system automatically purges the conveyors 10, 11, 12 and 13 of excess steam. That is, excess steam is drawn out of conveyor 10 and flows over the material in conveyors 11, 12 and 13 by reason of the suction effect of fan 72 and the nominal inherent pressure of the steam escaping out of the discharge end of conveyor 10. Alternatively, an air stack could be connected to the discharge end of conveyor 13 to draw off such excess steam.

Once the ground feed materials have been cooled to below 120° F. motion of the particles is not required since there will then be no tendency for the particles to bridge or cake. Thus, the apparatus handles the material rapidly in a volume of tons per hour and leaves the material salmonella free in a matter of minutes, in particle form and substantially unchanged in moisture content or nutritional value an achievement not heretofore obtained by any known prior art apparatus.

I claim:

1. A terminal heating apparatus for processing on a continuous large volume basis salmonella contaminated ground, organic feed materials in loose particle form capable of flowing freely in a stream at ambient temperature, in combination:
   a. supply means for supplying a continuous volume of said feed material particles at the rate of at least thousands of pounds per hour and in a continuous free flowing stream;
   b. an enclosed heat insulated elongated first nonperforate horizontal tubular receptacle having screw conveyor means adapted to tumble and advance said particles and having intake and discharge openings at opposite ends thereof, said intake opening being arranged to receive said stream of particles;
   c. means to preheat and maintain said first receptacle at an internal temperature of at least 180° F.;
   d. steam spray means mounted within said first receptacle and being adapted when operative to provide a substantially unpressurized and exclusively live steam atmosphere within said first receptacle throughout the length thereof;
   e. a source of substantially dry steam connected to said spray means and having valve means for controlling the connection between said source and said spray means;
   f. a temperature sensing means mounted adjacent said discharge opening of said first receptacle and being adapted to measure the temperature of said particles at said discharge opening and control said valve means whereby to maintain the temperature of said particles within a minimum range of 165° F. to 180° F.;
   g. a series of interconnected vertically stacked substantially unpressurized enclosed heat insulated nonperforate horizontal tubular receptacles, the first of said series having an intake opening connected to and forming a continuation of the discharge opening of the first receptacle, each of said series having external nonconvection heating means for addition of additional external heat as required to maintain a nonstatic slow moving mass of loose particles of said material at a temperature within the range of at least 165° F. to 180° F. and having in each of said series screw conveyor means for keeping said mass of particles in slow positive movement, said series of receptacles being below and longitudinally aligned with said first receptacle whereby to provide a substantially long downwardly moving heated insulated and enclosed flow path for said particles;

h. means to drive all of said receptacle conveyors whereby to maintain said particles within said first receptacle for a relatively short steaming period and in said series of receptacles for a substantially longer heat retention period with the total of said periods being sufficient to destroy all salmonella in said particles upon said particles reaching the discharge opening of the last of said series of receptacles; and i. means for continuously moving and withdrawing said particles from the discharge opening of the last of said series of receptacles at a rate designed to maintain a substantially uniform rate of flow through all said receptacles of said thousands of pounds per hour and being effective during said withdrawal and movement of said particles to reduce the temperature of said particles to at least 120° F. before said particles are allowed to assume a static state.

2. An apparatus according to claim 1 wherein said spray means comprises a series of perforated pipes extending the length of said first receptacle and said temperature sensing means include means to regulate said valve means whereby to selectively control said pipes according to the temperature of said particles at the discharge opening of said first receptacle.

3. An apparatus according to claim 1 wherein said withdrawing means includes means for introducing cooling air to said particles from a noncontaminated ambient air source to effect reduction of said temperature to 120° F.

4. An apparatus according to claim 1 including baffle means for controlling the rate of introduction of said stream into said first receptacle intake opening according to the bulking weight thereof.

5. An apparatus according to claim 1 wherein said screw conveyor means in said first receptacle comprises a cut and fold type conveyor.

6. An apparatus according to claim 1 wherein said conveyor drive means is adapted to rotate said conveyors at speeds designed to maintain said particles in said first receptacle for about two minutes and in said series of receptacles for about six minutes.

7. An apparatus according to claim 3 wherein said means for introducing said cooling air to said particles includes a fan and conduit connected to move said cooling air past the discharge opening of said last of said series of conveyors whereby to continuously pull said particles and excess steam from said first and series of receptacles into said conduit and means for thereafter separating out said air from said particles.